Oct. 23, 1923.
C. L. MUTRIX
1,471,409
STEERING GEAR LOCK
Filed Jan. 2, 1923
2 Sheets-Sheet 1
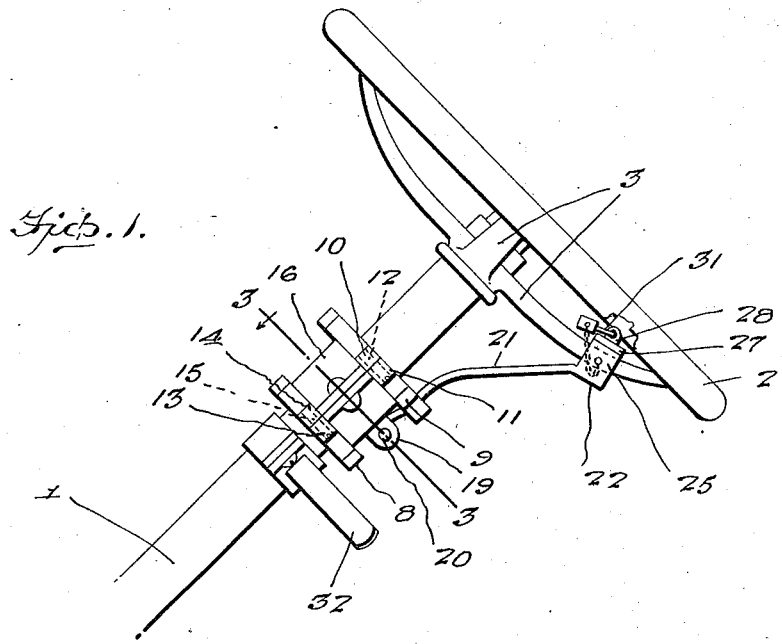
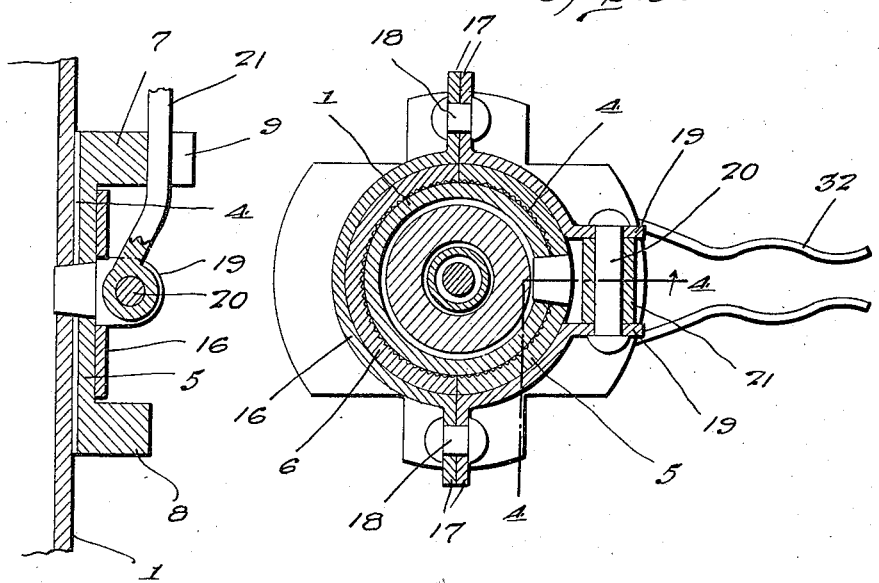

Oct. 23, 1923.　　　　　　　　　　　　　　　　　　　　1,471,409
C. L. MUTRIX
STEERING GEAR LOCK
Filed Jan. 2, 1923　　　　　　　　2 Sheets-Sheet 2
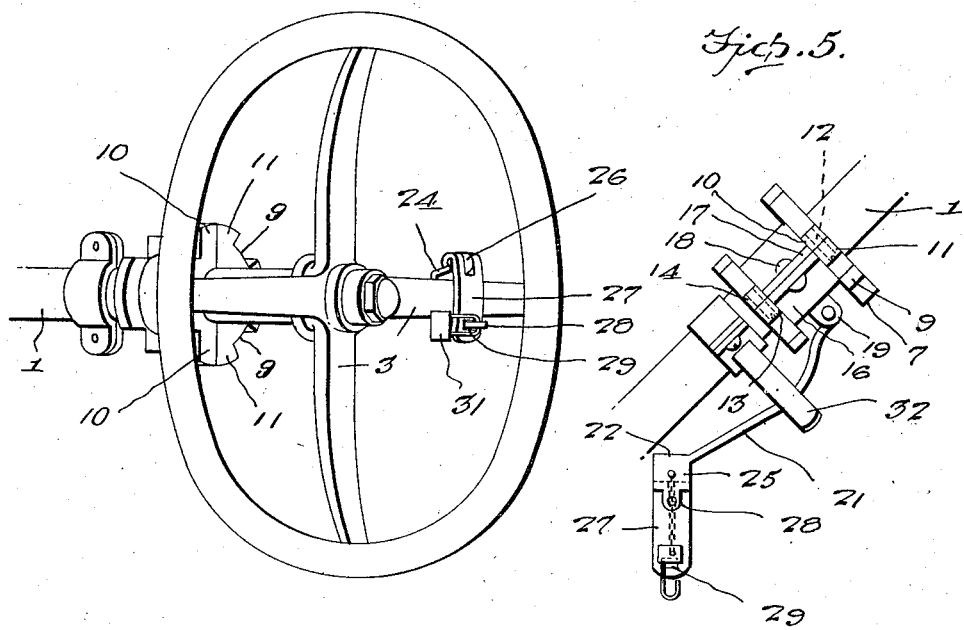
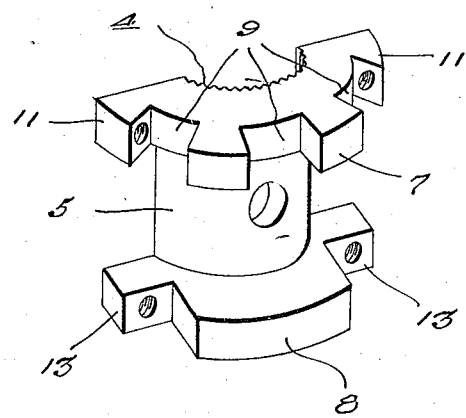
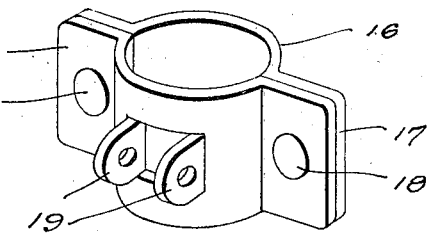

Patented Oct. 23, 1923.

1,471,409

UNITED STATES PATENT OFFICE.

CHARLES L. MUTRIX, OF NEW ORLEANS, LOUISIANA.

STEERING-GEAR LOCK.

Application filed January 2, 1923. Serial No. 610,279.

*To all whom it may concern:*

Be it known that I, CHARLES L. MUTRIX, a citizen of the United States, residing at New Orleans, in the parish of Orleans and State of Louisiana, have invented new and useful Improvements in Steering-Gear Locks, of which the following is a specification.

An object of this invention is to provide a means for locking the steering wheel of an automobile from turning so that the car may be safely parked without danger of being stolen when not occupied by the owner.

A further object is to produce a device for this purpose which shall be characteristic of simplicity in construction, cheapness in manufacture, ease in application, and thorough efficiency in operation.

To the attainment of the foregoing and other objects which will present themselves as the nature of the invention is better understood, reference is to be had to the drawings which accompany and form part of this application.

In the drawings:—

Figure 1 is a view of a steering wheel locked to a steering post column in accordance with this invention.

Figure 2 is a top plan view thereof.

Figure 3 is a sectional view on the line 3—3 of Figure 1.

Figure 4 is a sectional view on the line 4—4 of Figure 3.

Figure 5 is a view showing the manner in which the device is held against the steering post column when not in use.

Figure 6 is a perspective view of the sections having the notched flanges.

Figure 7 is a similar view of the collar which is revolubly arranged on the sleeve and which carries the wheel carrying element.

Referring now to the drawings in detail, the numeral 1 designates a steering post column for an automobile, and 2 the steering wheel secured to the steering post that is received through the column. The steering wheel is of the ordinary construction, having between its central portion or hub and rim radial spokes 3.

On the column, 1, at a suitable distance below the steering wheel I secure a collar. This collar is made up of two sections which may be of a similar construction. The collar has its bore provided with ribs 4 to tightly contact or embed themselves in the column 1 when the collar sections are connected. The bore of the collar corresponds to the cross sectional contour of the column 1, and each of the collar sections has its outer periphery substantially semi-cylindrical in cross section. The collar sections, designated by the numerals 5 and 6 respectively each has its ends provided with flanges 7 and 8 respectively, and the upper flange 7 on the inner collar section 5 is provided with spaced notches 9, the upper flange 7 on the section 6 being notched adjacent to the sides thereof to provide fingers or lugs 10 which align with the outer teeth 11 provided between the notches 9, and passing through these teeth and through the fingers 11 are binding elements 12. The lower flanges 8 on the collar sections 6 and 7 are notched to provide projecting fingers 13 and 14 at the confronting surfaces of the said flanges, and through these fingers there are passed securing means 15. The securing means for the flanges of both collars are preferably in the nature of headless bolts, the said bolts having kerfed ends which are received in suitable pockets in the fingers of one of the collar members, the threaded shanks of the bolts engaging in the threads of openings in the flanges of the cooperating collar.

Revolubly mounted on the collar between the flanged end thereof there is a revoluble sleeve 16. The sleeve is also constructed of two sections having their confronting ends flanged outwardly, as at 17, and secured together by means 18. One of the sleeve sections 16 has its under face centrally provided with spaced ears 19, and between these ears there is pivoted, as at 20, one end of a metal bar 21. The bar is rounded outwardly from its pivotal connection with the sleeve and is from thence further rounded outwardly to provide what may be termed an arched portion 22, the latter terminating in a straight extension 23 which has its ends formed with upwardly directed ears 24 and 25 respectively. Of course, these ears may be formed on a plate that is secured to the said end of the bar 21. On one of the ears 24 there is hinged, as at 26, a latch plate 27, and on the other ear there is a central outstanding finger 28 designed to be received through a slot or opening 29 in the latch plate 27. The finger is provided with an opening to receive therethrough the hasp of a lock 31 when the bar has been swung to be received in one of the notches 9 of the upper flange 7 of the collar to arrange the spaced ears in straddling relation with respect to one of the spokes, whereafter the latch plate is swung over the said spoke and the lock 31 attached to the finger. The bar 21 is effectively locked from movement when received in the notch of the collar, so that the turning of the steering wheel, when the device is in applied position, will be effectively prevented.

When not in use, the pivot bar 21 is permitted to swing downwardly and enter one of the notches provided between the fingers in the lower flange of the sectional collar and the lower end of the said bar is engaged by a spring latching means 32 secured on the steering column.

It is thought that the foregoing description when taken in connection with the drawings will fully set forth the construction, operation and advantages of the improvement to those skilled in the art to which such inventions relate, but it is also deemed necessary to state that I do not wish to be restricted to the precise details of construction herein set forth, but hold myself entitled to such changes therefrom as fall within the scope of what I claim without departing from the spirit of the invention.

Having described the invention, I claim:

1. The combination of a steering post wheel and a steering column therefor; of a means for holding the wheel from turning on the column, comprising a sleeve mounted for turning around the column, a bar hingedly secured to the sleeve swingable against the column or toward the steering wheel, means for latching the bar to the column when in first mentioned position, means for locking the bar to the steering wheel when in last mentioned position, and means between the bar and mounting for the sleeve for holding both bar and sleeve from movement on the column when the said bar is in last mentioned position.

2. The combination of a steering post wheel and a steering post column; of a means for locking the wheel from turning on the column, comprising a collar fixed around the column, a sleeve revoluble on the collar, a bar hinged to the sleeve, means on the bar to engage a spoke of the wheel when said bar is swung toward the wheel, means locking such engaging means, and means on the collar engaging the bar for holding the sleeve from turning when the wheel is locked.

3. The combination with a steering post wheel and a steering post column; of means for holding the wheel from turning on the column, comprising a collar fixed around the steering post column having outwardly flanged notched ends, a sleeve revoluble around the collar between the flanges thereof, a bar pivoted to the sleeve for swinging toward or away from the steering wheel, means on the sleeve for latching the bar thereto when the latter is in first mentioned position, means on the bar for inserting a spoke of the steering wheel, means locking said last mentioned means, and said bar designed to be received between the notches in the flanges of the collar when in either of said positions.

In testimony whereof I affix my signature.

CHARLES L. MUTRIX.